United States Patent
Yamaguchi et al.

(10) Patent No.: US 8,388,311 B2
(45) Date of Patent: Mar. 5, 2013

(54) TURBOMACHINERY

(75) Inventors: Kazuyuki Yamaguchi, Kasumigaura (JP); Yohei Magara, Mito (JP); Toyomi Yoshida, Kasumigaura (JP); Michiyuki Takagi, Ushiku (JP); Kenichi Murata, Hitachi (JP); Takeshi Kudo, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 894 days.

(21) Appl. No.: 12/491,391

(22) Filed: Jun. 25, 2009

(65) Prior Publication Data

US 2010/0166544 A1    Jul. 1, 2010

(30) Foreign Application Priority Data

Jun. 30, 2008 (JP) ................. 2008-169773

(51) Int. Cl.
  *F04D 29/10* (2006.01)
  *F01D 11/02* (2006.01)
(52) U.S. Cl. ............ 415/174.5; 415/173.5; 415/173.6; 277/412; 277/416; 277/916; 29/888.3
(58) Field of Classification Search .......... 277/412, 277/416, 421, 916; 415/170.1, 173.1, 173.5, 415/173.6, 173.7, 174.5, 229, 230; 29/888.3, 29/889.2, 889.22
  See application file for complete search history.

(56) References Cited

U.S. PATENT DOCUMENTS

| 8,128,352 | B2 * | 3/2012 | Caucheteux et al. ...... 415/173.4 |
| 2005/0067789 | A1 * | 3/2005 | McHale et al. ............... 277/412 |

FOREIGN PATENT DOCUMENTS

| FR | 2 893 357 A1 | | 5/2007 |
| FR | 0852718 A | * | 4/2008 |
| GB | 2 128 693 A | | 5/1984 |
| GB | 2128693 A | * | 5/1984 |
| JP | 10-61407 A | | 3/1998 |
| JP | 2005-214144 A | | 8/2005 |

* cited by examiner

*Primary Examiner* — Christopher Verdier
*Assistant Examiner* — Jason Davis
(74) *Attorney, Agent, or Firm* — Mattingly & Malur, PC

(57) ABSTRACT

A turbomachinery includes a labyrinth seal (2) to prevent unstable vibration of a rotor formed by dividing the seal into segments (7) in a circumferential direction and combining the segments (7) whose comb teeth (5) differ in height. The labyrinth seal (2) preferably includes two kinds of segments (7) whose comb teeth (5) differ in height for each kind of segment, and the segments (7a) of the greater comb tooth height are arranged in a certain reference direction on a cross section right-angled to a rotational axis, and in a direction opposite to the reference direction, and the segments (7b) of the smaller comb tooth height are arranged in a direction right-angled to the reference direction, and in a direction opposite to that right-angled to the reference direction.

4 Claims, 6 Drawing Sheets and TURBOMACHINERY

BACKGROUND OF THE INVENTION

1. Field of the Invention

The present invention relates to turbomachinerys, and for example, to a turbomachinery suitable for preventing unstable vibration of a rotor rotating at high speed.

2. Description of the Related Art

Turbomachinerys include a rotor with a rotating blade, and a stator for retaining the rotor and forming a flow path. A clearance exists between the stator and the rotor, and a labyrinth seal of a comb structure is usually used to reduce fluid leakage from the clearance.

High-speed rotation of the rotor may result in unstable vibration thereof due to the possible swirling flow of the fluid at grooves formed between the comb teeth of the labyrinth seal. To prevent unstable vibration, it is effective to reduce the swirling velocity of the fluid at the grooves. For example, as disclosed in FIG. 1 of JP-10-61407-A, a structure has been proposed that includes a guide vane set up at the fluid inlet side of a labyrinth seal in order to reduce a swirling fluid velocity.

An event of oil whip due to the swirling flow of a lubricating oil on fluid-film bearings possibly takes place as an event similar to the unstable vibration mentioned above. It is known that oil whip easily occurs with cylindrical bearings and that the occurrence of unstable vibration can be suppressed by adopting elliptical bearings or multi-robe bearings.

SUMMARY OF THE INVENTION

For example, the labyrinth seal disclosed using FIG. 1 of JP-10-61407-A has the problem that the complex construction of the guide vane used for reducing the swirling velocity of the fluid makes the seal troublesome to manufacture and increases the manufacturing cost thereof.

An object of the present invention is to provide a turbomachinery including a labyrinth seal easy to manufacture and adapted to prevent unstable vibration of a rotor.

In order to solve the above problem, a turbomachinery according to the present invention comprises: a rotor with a rotating blade; a stator for retaining the rotor; and a labyrinth seal disposed in a clearance between the stator and the rotor; wherein the labyrinth seal is constructed such that plural kinds of segments of different comb tooth heights are arranged in annularly connected form to create a stepped portion at an inner lower edge of the labyrinth seal.

The above labyrinth seal preferably includes two kinds of segments different in comb tooth height for each kind of segment. The segments of the greater comb tooth height are arranged in a certain reference direction on a cross section right-angled to a rotational axis, and in a direction opposite to the reference direction. The segments of the smaller comb tooth height are arranged in a direction right-angled to the reference direction, and in a direction opposite to that right-angled to the reference direction.

According to the present invention, a swirling velocity of a fluid at the labyrinth seal can be reduced and unstable rotor vibration prevented.

DESCRIPTION OF THE PREFERRED EMBODIMENT

The best mode for carrying out the present invention is described below with reference to the accompanying drawings.

Figure 1:
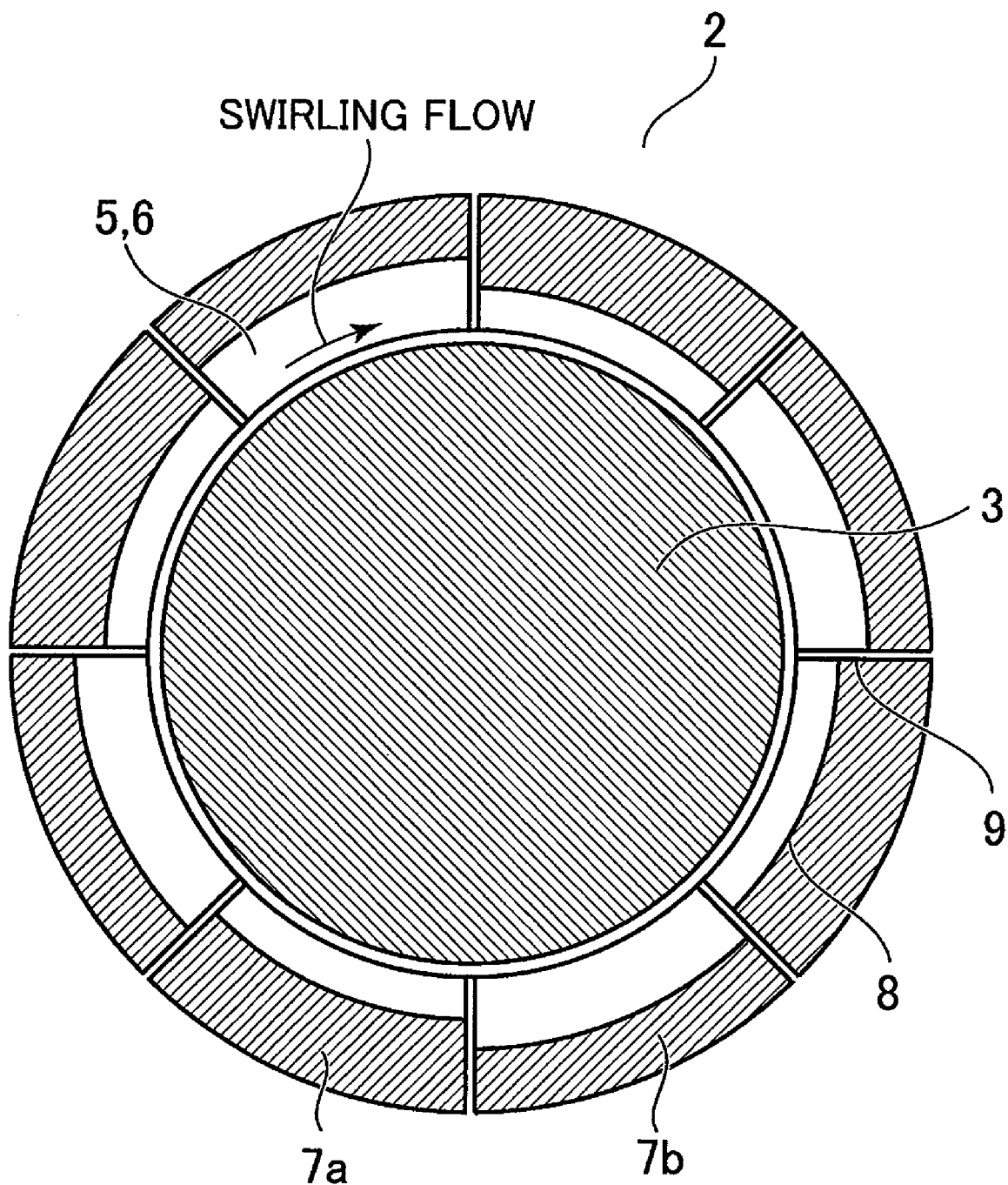
FIG. 1 is an axially right-angled sectional view of a labyrinth seal in an embodiment of a turbomachinery according to the present invention.

FIG. 1 shows an axially right-angled sectional view of a labyrinth seal 2 in one embodiment of a turbomachinery 1 according to the present invention. FIG. 2A shows sectional view of essential sections of the turbomachinery 1 according to the present embodiment.

Figure 2:
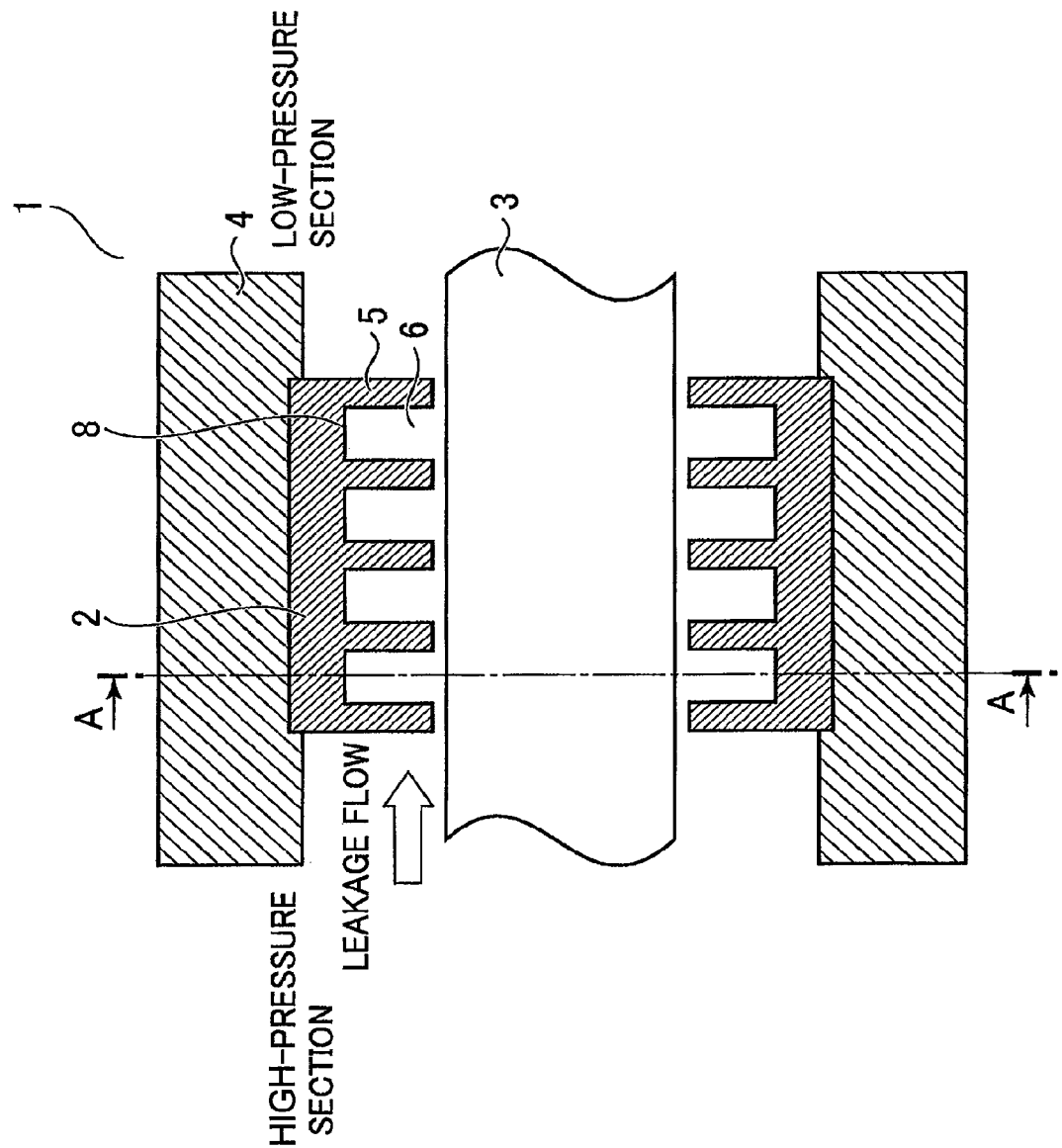
FIG. 2 is a sectional view of essential sections of the turbomachinery according to the embodiment.

As shown in FIG. 2, the turbomachinery 1 according to the present embodiment includes a rotor 3 having a rotating blade (not shown) and adapted to rotate at high speed, and a stator 4 that retains the rotor 3 and forms a flow path not shown. Since a high-pressure section and a low-pressure section generally exist in the turbomachinery 1, a leakage flow of a fluid from the high-pressure section to the low-pressure section occurs at a clearance between the rotor 3 and the stator 4. The turbomachinery 1 has the labyrinth seal 2 of a comb structure 5 to reduce the leakage flow.

FIG. 1 is a sectional view of the labyrinth seal taken along the line A-A of FIG. 2. A swirling flow at an inlet of the labyrinth seal 2, and simultaneous rotation due to the rotation of the rotor 3 cause the swirling flow to also occur in grooved section 6 formed between comb teeth 5 of the labyrinth seal 2.

The labyrinth seal 2 in the present embodiment is divided into eight segments 7 in a circumferential direction. Segment 7a greater in comb tooth height, and segment 7b smaller in comb tooth height are arranged next to each other in alternate form. Movement of the swirling flow across a stepped portion 9 at a bottom portion 8 of the grooved section 6 increases flow path resistance, thus reducing the velocity of the swirling flow. In addition, the labyrinth seal 2 can be fabricated easily, in comparison with the case in which a guide vane or the like is manufactured, by forming two kinds of labyrinth seals 2 of different comb tooth heights into a ring shape, then dividing this ring into segments, and combining the segments.

The labyrinth seal 2 may be divided into any plural number of segments in the circumferential direction. The arrangement of the segment 7a greater in comb tooth height and the segment 7b smaller in comb tooth height, may not be of the alternate form. The segments 7 different in comb tooth height are preferably formed in a plurality of arrays.

Figure 3:
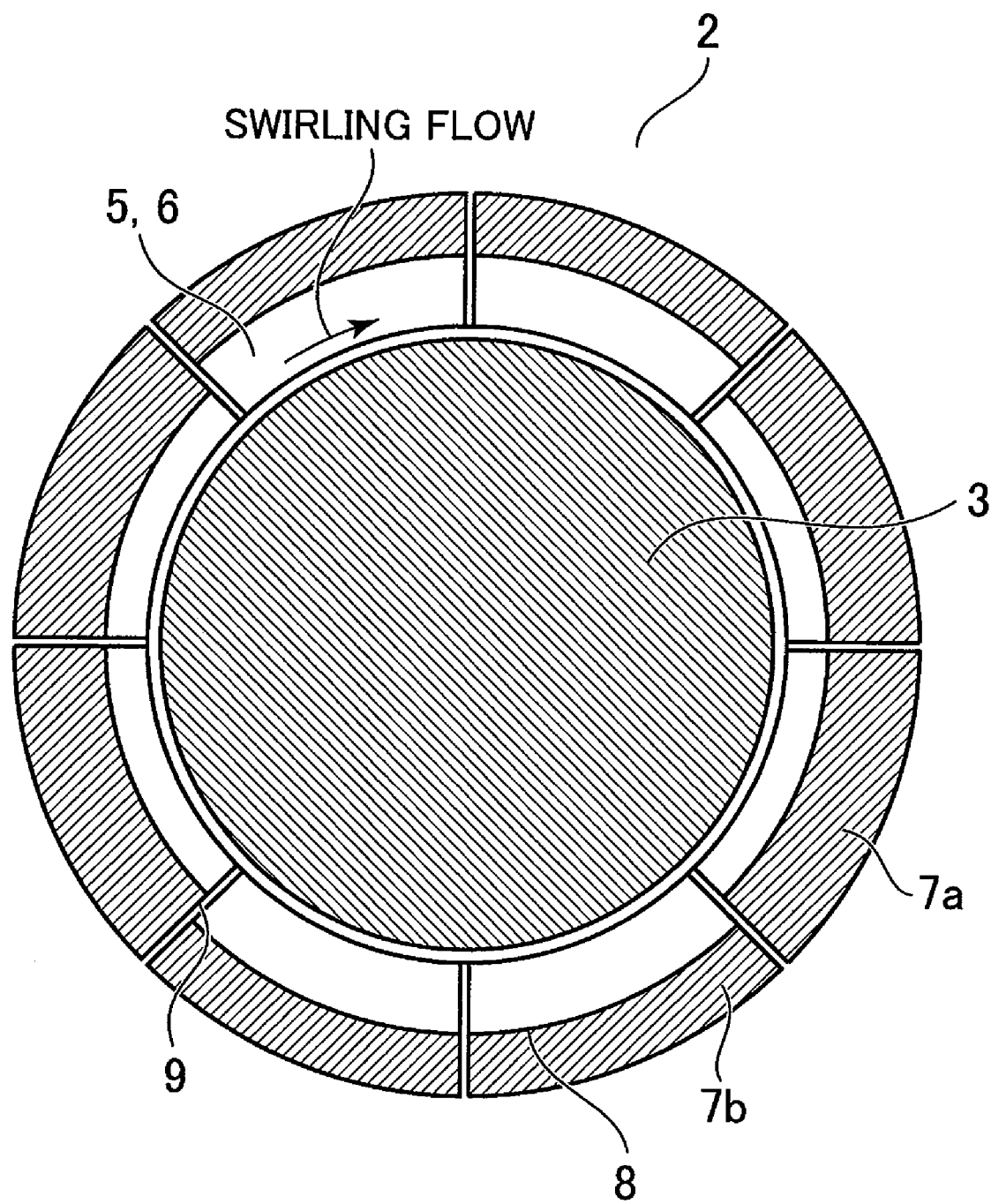
FIG. 3 is an axially right-angled sectional view of a labyrinth seal in another embodiment of a turbomachinery according to the present invention.

FIG. 3 shows an axially right-angled sectional view of a labyrinth seal 2 in another embodiment of a turbomachinery according to the present invention. The labyrinth seal 2 in the present embodiment is divided into eight segments 7 in a circumferential direction. Four segments 7 in a vertical direction, two at an upper position and two at a lower position, are greater in comb tooth height, while four segments 7 in a horizontal direction, two at left and two at right, are smaller in comb tooth height. That is to say, if an upward direction is taken as a reference direction, the segments 7a greater in comb tooth height are arranged in the upward direction that is the reference direction, and in a downward direction inverse thereto, while the segments 7b smaller in comb tooth height are arranged in a rightward direction right-angled to the reference direction, and in a leftward direction inverse thereto. If the labyrinth seal 2 is considered to have a major axis in the vertical direction in which the segments of the greater comb tooth height are arranged, and a minor axis in the horizontal direction in which the segments of the smaller comb tooth height are arranged, it can be seen that these arrangements provide advantageous effects similar to those achievable by forming the bottom portion 8 of the grooved section 6 into an elliptic shape. For this reason, unstable vibration of the rotor 3 can be prevented by utilizing essentially the same effect as that of preventing oil whip by the adoption of elliptical bearings.

As described above, the turbomachinery according to the present embodiment has the labyrinth seal formed by combining segments of different comb tooth heights, so that a stepped portion is formed at an outer surface of the grooved section of the labyrinth seal. Consequently, the swirling velocity of the fluid at the labyrinth seal can be reduced and unstable rotor vibration can be prevented. In addition, the labyrinth seal can be easily fabricated by forming two kinds of labyrinth seals 2 of different comb tooth heights into a ring shape, then dividing this ring into segments, and combining the segments.

Furthermore, the labyrinth seal includes two kinds of segments different in comb tooth height for each kind of segment. Arrangement of these segments is described below. The segments greater in comb tooth height are arranged in a reference direction on a cross section right-angled to a rotational axis, and in a direction opposite to the reference position. The segments smaller in comb tooth height are arranged in a direction right-angled to the reference direction, and in a direction opposite to the right-angled direction. Therefore, the major axis and minor axis of the labyrinth seal with the segments of the greater comb tooth height and the segments of the smaller comb tooth height respectively, are formed in a cross-section region right-angled to the rotational axis on the outer surface of the grooved section of the labyrinth seal. For this reason, unstable vibration of the rotor can be prevented by utilizing essentially the same effect as that of preventing oil whip by the adoption of elliptical bearings.

Next, another embodiment of a turbomachinery according to the present invention is described below with reference to the accompanying drawings.

Figure 4:
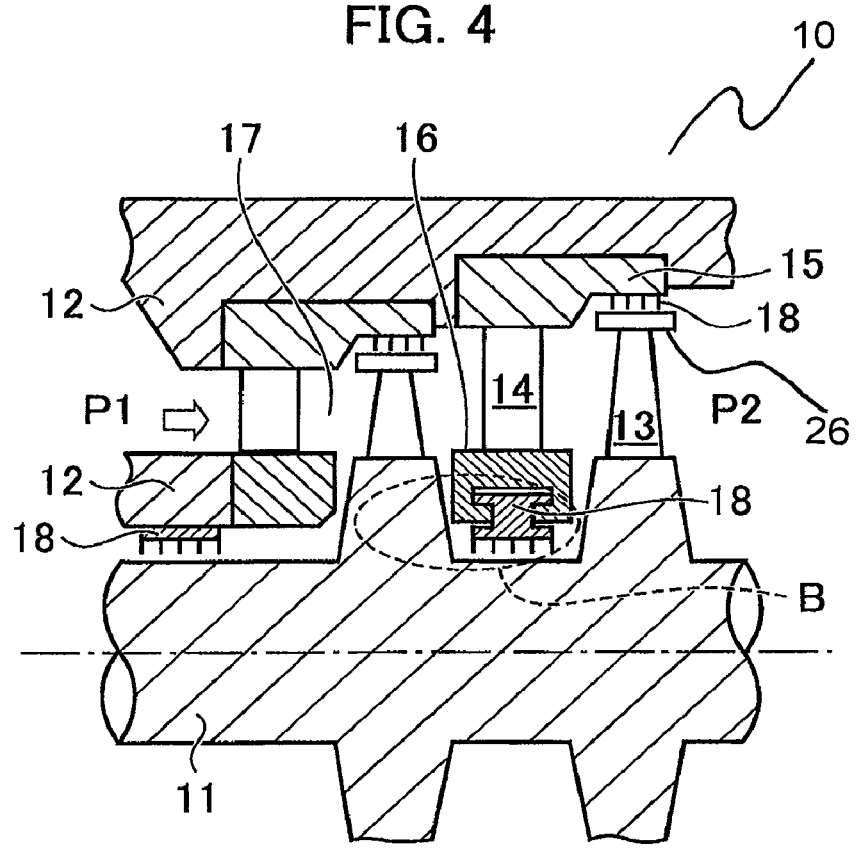
FIG. 4 is a partial side view of a steam turbine to which the present invention is applied.
Figure 5:
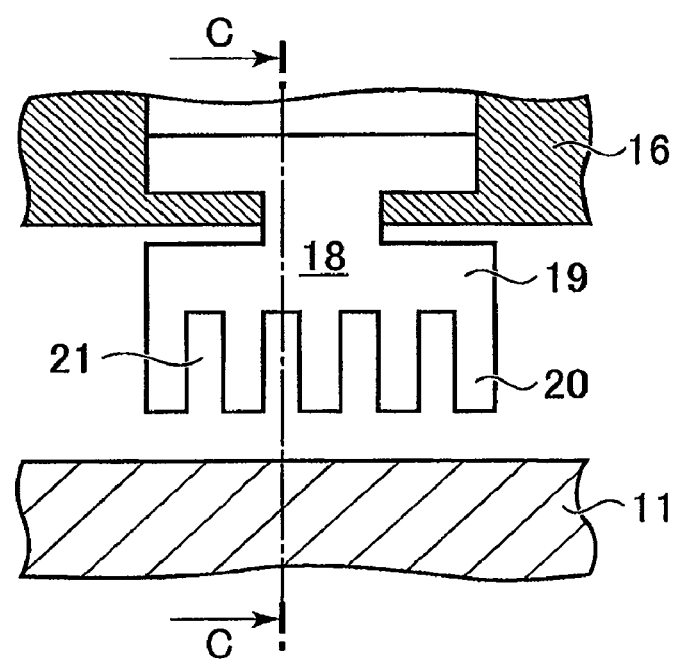
FIG. 5 is a partial, enlarged view of section B in FIG. 4.

FIG. 4 is a partial side view showing an embodiment in a steam turbine as an example of a turbomachinery according to the present invention. FIG. 5 is a partial, enlarged view of section B in FIG. 4.

The steam turbine 10 includes a turbine rotor 11 and a turbine casing 12 shrouding the turbine rotor 11 in a circumferential direction of the rotor 11. The turbine rotor 11 has a plurality of turbine rotor blades 13 fixed in the circumferential direction at an outer-surface side of the rotor 11. At an inner-surface side of the turbine casing 12, an outer diaphragm 15 is fixedly provided in annular form in a circumferential direction of the turbine casing 12. Also, at an inner-surface side of the outer diaphragm 15, an inner diaphragm 16 is fixedly provided in annular form in the circumferential direction of the turbine casing 12, thereby forming a working fluid flow path 17. In addition, a plurality of turbine nozzles 14 are fixed in a circumferential direction between the inner diaphragms 15 and the outer diaphragm 16.

Between a high-pressure section P1 and a low-pressure section P2 of the working fluid flow path 17 inside the turbine casing 12, the steam turbine has a plurality of turbine stages, each including one turbine rotor blade 13 and one turbine nozzle 14, in a direction of flow of a working fluid. At each of the turbine stages, the steam turbine uses the turbine nozzle 14 to convert thermal energy of steam, the working fluid, into kinetic energy and uses the turbine rotor blade 13 to further convert the kinetic energy into mechanical work. Thus, the turbine rotationally drives the rotor and obtains motive power.

As shown in FIG. 4, the steam turbine includes clearances defined between a stationary section (the stator) and rotary section of the steam turbine, such as between the turbine casing 12 and turbine rotor 11, between the inner diaphragm 15 and the turbine rotor 11, or between the outer diaphragm 15 and a shroud 26 provided at a distal end of the turbine rotor blade. A leakage flow of the working fluid stems from the clearances. In order to reduce leakage loss due to the leakage flow of the working fluid, labyrinth seals 18 of a comb structure are provided in the clearances between the stationary section and the rotary section.

The structure of the labyrinth seals in the present embodiment is described next.

FIG. 5 is a partial, enlarged view of section B in FIG. 4. As shown in FIG. 5, one labyrinth seal 18 is provided in the clearance between the inner diaphragm 16 and turbine rotor 11 of the steam turbine. The labyrinth seal 18 has a base 19 and a plurality of comb teeth 20 provided at the base 19, and is formed with grooves 21 between the base 19 and the comb teeth 20.

Figure 6:
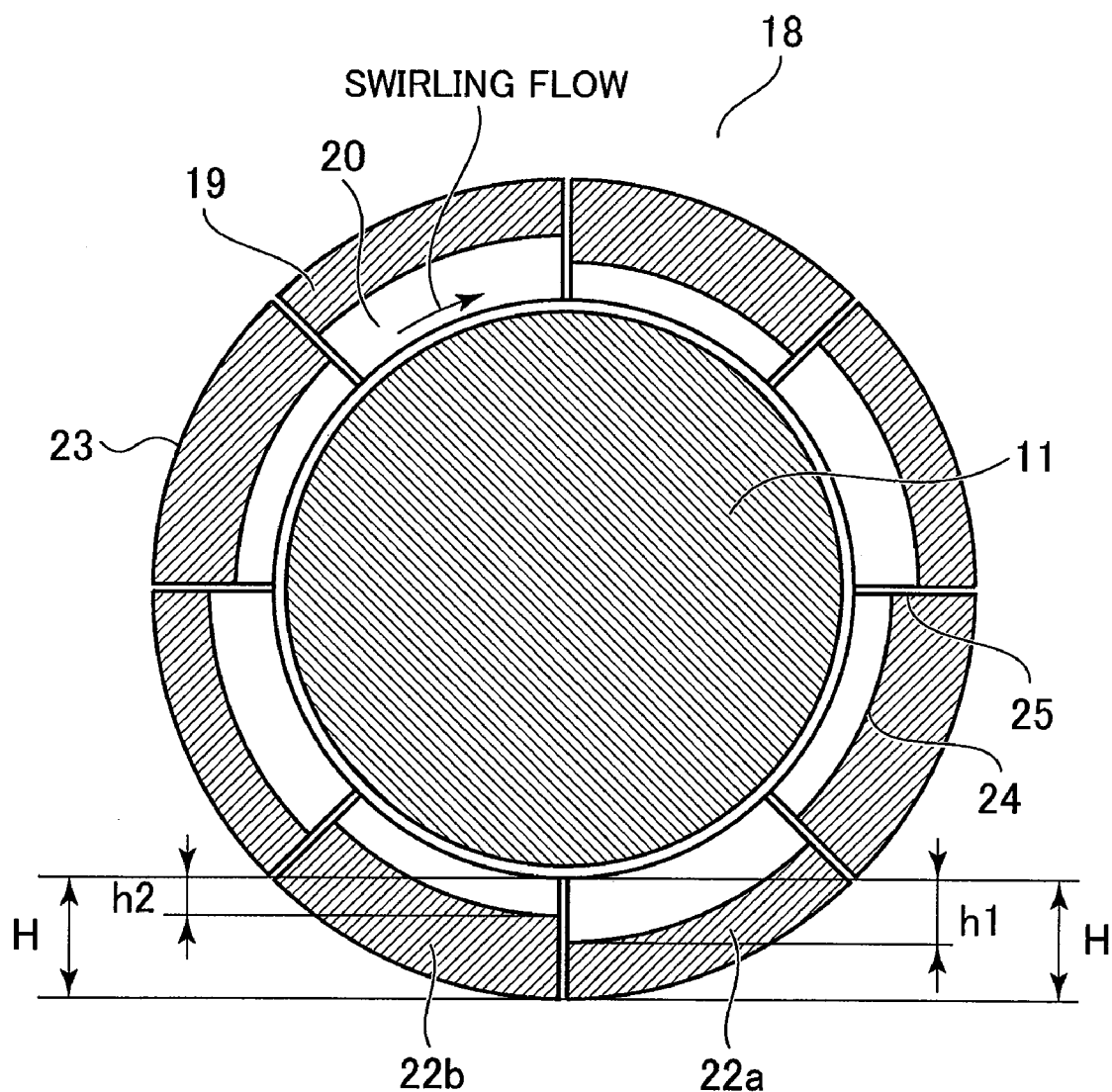
FIG. 6 is a sectional view of the labyrinth seal as viewed from a direction of arrow C in FIG. 5.

FIG. 6 is a sectional view of the labyrinth seal 18 as viewed from a direction of arrow C in FIG. 5. The labyrinth seal 18 according to the present embodiment is divided into eight segments that are circular in cross section. Suppose radial comb tooth height of the comb teeth 20 from a bottom face 24 of the seal inner surface to the distal end of the comb teeth 20 to be "h," the eight segments includes segments 22a with radial comb tooth height "h1" and segments 22b with radial comb tooth height "h2" smaller than "h1" to constitute two kinds of segments. The eight segments are all constructed to be equal to one another in segment height H, a sum of comb tooth height "h" and radial height of the base 19.

In the present embodiment, in order that a stepped portion 25 is formed circumferentially at the labyrinth inner-surface bottom 24, the two kinds of segments 22a and 22b that differ in comb tooth height are mounted annularly in the circumferential direction of the turbine rotor 11 such that four pieces of each kind are arranged at alternate positions at the inner diaphragm 16. The labyrinth inner-surface bottom 24 is therefore formed so as to be repeatedly wrinkled in the circumferential direction.

The labyrinth seal 18 can have any plural number of segments. Although the segments 22a of the greater comb tooth height and the segments 22b of the smaller comb tooth height do not always require alternate arrangement, segments different in comb tooth height are preferably formed in a plurality of arrays. In addition, although the two kinds of segments 22a and 22b that differ in comb tooth height are used in the present embodiment, the number of kinds of segments can be three or more.

The labyrinth seal 18 in the present embodiment can also be applied to the clearances between the turbine casing 12 and the turbine rotor 11 and between the outer diaphragm 15 and the shroud 26 provided at the distal end of the turbine rotor blade.

As shown in FIG. 6, in steam turbines and other turbomachinerys, a swirling flow at the inlet of a labyrinth seal and simultaneous rotation due to rotor rotation result in the swirling flow also occurring in grooves formed between comb teeth of the labyrinth seal. In the present embodiment, however, since the swirling flow passes over the stepped portion 25 at the labyrinth seal inner-surface bottom 24 which is also a bottom of the grooved section 20, the swirling velocity of a leakage flow is reduced by an increase in flow path resistance, thereby obtaining a suppression effect against unstable rotor vibration.

Next, a method of fabricating labyrinth seals according to the present embodiment is described below.

Figure 7:
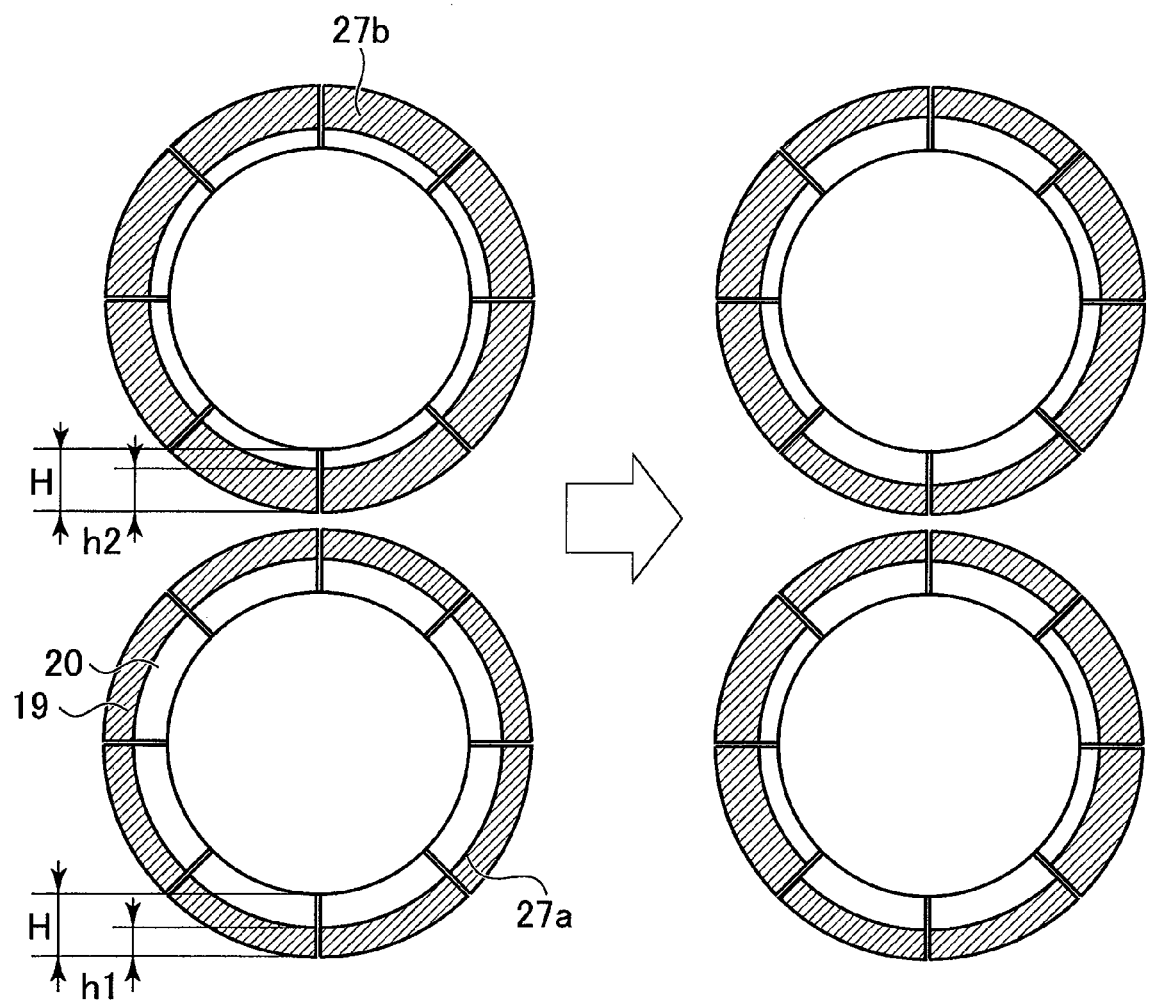
FIG. 7 is a fabrication drawing that explains a method of fabricating labyrinth seals according to the present invention.

FIG. 7 is a fabrication drawing that explains the fabricating method according to the present embodiment.

In a first step of the fabricating method, ring-shaped labyrinth seals having a base 19 and comb teeth 20 are fabricated, one of the labyrinth seals being a labyrinth seal 27a with comb tooth height "h1" and the other labyrinth seal being a labyrinth seal 27b with comb tooth height "h2". The labyrinth seals 27a and 27b are fabricated to be equal between both in terms of seal height, a sum of radial height of the base 19 and that of the comb teeth 20.

Next, the fabricated labyrinth seals 27a and 27b are each divided into eight circular segments by cutting.

In a second step of the fabricating method, the segments of each labyrinth seal 27a and 27b are mounted in annularly connected form at a mounting section (not shown) that is provided in the stator.

According to the configuration of the present embodiment, a labyrinth seal can be easily fabricated by forming labyrinth seals of different comb tooth heights into a ring shape, dividing the fabricated labyrinth seals into segments, and combining these segments. The labyrinth seal of this configuration can be easily fabricated in comparison with the case in which a guide vane or the like is manufactured.

What is claimed is:

1. A turbomachinery comprising:
   a rotor with a rotating blade;
   a stator for retaining the rotor; and
   a labyrinth seal disposed in a clearance between the stator and the rotor;
   wherein the labyrinth seal includes a plurality kinds of segments of different comb teeth heights annularly disposed and connected around the rotor and having at least one stepped portion at an inner lower edge of adjacent ones of the segments of the labyrinth seal, wherein grooves formed between the comb teeth receive fluid.

2. The turbomachinery according to claim 1, wherein:
   the labyrinth seal has two kinds of segments each kind different in comb tooth height, the segments of the greater comb tooth height being arranged in a certain reference direction on a cross section right-angled to a rotational axis of the rotor, and in a direction opposite to the reference direction, and the segments of the smaller comb tooth height being arranged in a direction right-angled to the reference direction, and in a direction opposite to that right-angled to the reference direction.

3. The turbomachinery according to claim 1, wherein:
   the segments of different comb tooth heights are disposed side by side in a circumferential direction.

4. A method of manufacturing a labyrinth seal provided in a clearance between a rotary section and stationary section of a turbomachinery, the method comprising:
   a first step of manufacturing circular segments by fabricating plural kinds of labyrinth seals of different comb tooth heights into a ring shape and then cutting each of the fabricated labyrinth seals into segment form; and
   a second step of forming another labyrinth seal by connecting in annular form the plural kinds of segments of the different comb tooth heights formed in the first step.

\* \* \* \* \*